United States Patent [19]

Kim

[11] Patent Number: 5,555,138
[45] Date of Patent: *Sep. 10, 1996

[54] AUTOMATIC VIDEO TAPE RUNNING MODE SETTING CIRCUIT FOR PROGRAMMED RECORDINGS

[75] Inventor: Jeong-ho Kim, Taegu, Rep. of Korea

[73] Assignee: SamSung Electronics Co., Ltd., Kyungki, Rep. of Korea

[*] Notice: The term of this patent shall not extend beyond the expiration date of Pat. No. 5,117,316.

[21] Appl. No.: 318,203

[22] Filed: Oct. 5, 1994

Related U.S. Application Data

[63] Continuation of Ser. No. 886,811, May 22, 1992, abandoned, which is a continuation of Ser. No. 382,271, Jul. 20, 1989, Pat. No. 5,117,316.

[30] Foreign Application Priority Data

Aug. 26, 1988 [KR] Rep. of Korea .................. 13932/1988

[51] Int. Cl.⁶ .................................................. G11B 15/18
[52] U.S. Cl. ............................................ 360/69; 358/335
[58] Field of Search ........................... 360/69, 71, 73.05, 360/73.06, 73.07, 137, 72.3; 358/335

[56] References Cited

U.S. PATENT DOCUMENTS

| | | | |
|---|---|---|---|
| 3,691,314 | 9/1972 | De Bell et al. ................. | 179/100.25 |
| 3,834,648 | 9/1974 | Rose, Jr. et al. ............... | 242/186 |
| 4,267,564 | 5/1981 | Flores .............................. | 360/72.3 |
| 4,338,640 | 7/1982 | Yabu et al. . | |
| 4,339,776 | 7/1982 | Länger et al. .................. | 360/69 |
| 4,358,798 | 11/1982 | Hedlund et al. ................ | 360/73 |
| 4,478,376 | 10/1984 | Sakaguchi et al. ............. | 360/74.1 |
| 4,550,349 | 10/1985 | Okuyama et al. .............. | 360/10.2 |
| 4,882,640 | 11/1989 | Wakui ............................. | 360/73.05 |
| 5,032,937 | 7/1991 | Suzuki et al. .................. | 360/73.06 |
| 5,117,316 | 5/1992 | Kim ................................ | 360/69 |

Primary Examiner—Aristotelis Psitos
Assistant Examiner—James T. Wilson
Attorney, Agent, or Firm—Robert E., Esq. Bushnell

[57] ABSTRACT

An automatic video tape running mode setting circuit for programmed recordings is disclosed which comprises a programmed recording time memory means for memorizing and outputting the programmed start and end times successively for a plurality of broadcast programs set by the user; a programmed recording time detector for detecting the total programmed recording time by subtracting said start time from said end time individually, and by summing up all the individual times; a recording capacity detector and a recording capacity time base data generator for detecting and generating a recording capacity time base data off the loaded video tape; and a running mode signal generator for a predetermined video tape running mode signal to a microcomputer for controlling the operation of the whole system.

17 Claims, 4 Drawing Sheets

| SWITCH / Rec.Cap. | 32A | 32B | 32C |
|---|---|---|---|
| 30 MINUTES | OPEN | OPEN | OPEN |
| 60 MINUTES | CLOSED | OPEN | OPEN |
| 90 MINUTES | OPEN | CLOSED | OPEN |
| 120 MINUTES | CLOSED | CLOSED | OPEN |
| 180 MINUTES | OPEN | OPEN | CLOSED |
| 240 MINUTES | CLOSED | OPEN | CLOSED |

5,555,138

AUTOMATIC VIDEO TAPE RUNNING MODE SETTING CIRCUIT FOR PROGRAMMED RECORDINGS

This is a continuation of application Ser. No. 07/886,811, filed 22 May 1992 now abandoned, which is a continuation of Ser. No. 07/382,271 filed 20 Jul. 1989, now U.S. Pat. No. 5,117,316 issued on 26 May 1992.

CROSS REFERENCE TO RELATED APPLICATIONS

This application makes reference to my co-pending application earlier filed in the United States Patent & Trademark Office on 20 Jul. 1989 and assigned Ser. No. 07/382,271, which was issued as a letters patent on 26 May 1992 as U.S. Pat. No. 5,117,316, and claims the benefits available under 35 U.S.C. §120, and makes reference to a utility application filed in the Korea Industrial Property Office of the Republic of Korea on 26 Aug. 1988 and assigned application Ser. No. 1988/13932, and claims the benefits available under 35 U.S.C. §119.

FIELD OF THE INVENTION

The present invention relates to an automatic video tape running mode setting circuit for programmed recordings, which is capable of detecting the recording time and the video tape capacity to automatically set an SP (Standard Play) mode, an LP (Long Play) mode or an SLP (Super Long Play) mode, in the case where a video tape recorder has programmed recording capabilities.

BACKGROUND OF THE INVENTION

Generally, in the case where a video tape recorder is made to perform a programmed recording for a certain broadcast program, the user has to control the running mode switch to set the running mode of the video tape recorder. However, users are generally accustomed to pre-register the start and end time of the broadcast program and to forget the setting of the video tape running mode, while the running mode of the video tape is usually set to an SP mode.

However, in carrying out a programmed recording with the video tape running mode set to an SP mode, if the recording capacity of the video tape is larger than the programmed recording time of the broadcast program to be recorded, the whole program can be recorded well. On the other hand, if the programmed recording time is larger than the recording capacity of the video tape, the posterior content of the broadcast program will fail to be recorded due to the insufficiency of the video tape.

SUMMARY OF THE INVENTION

Therefore it is the object of the present invention to provide an automatic video tape running mode setting circuit for programmed recordings, which is capable of comparing the total programmed recording time with the recording capacity of the video tape loaded in the deck, and automatically setting the running mode to an SP mode, LP mode or SLP mode, so that the trouble of manually setting the video tape running mode by the user is removed, and that the failure of recording for the posterior content of the program can be prevented.

In achieving the above object, the automatic running mode setting circuit according to the present invention comprises a programmed recording time memory device for memorizing the programmed recording start and end times successively for a plurality of broadcast programs set by the user; a programmed recording time detector for detecting the whole programmed recording time for the programs to be recorded by subtracting the start time from the end time to calculate each programmed recording time per broadcast program, and by adding all such recording times to obtain the total programmed recording time for all the programs; a recording capacity detector for detecting the recording capacity of the video tape loaded in the deck; a recording capacity time base data generator for generating the time base data corresponding to the recording capacity detected by the recording capacity detector; and a running mode signal generator for generating and transmitting a video tape running mode signal to a microcomputer which controls the operation of the whole system by comparing the output signals of the programmed recording time detector and the recording capacity time base data generator.

The automatic running mode setting circuit according to the present invention as described above will be operated as described below. If the user sets the programmed recording start and end times for the desired broadcast program, then the programmed recording time memory device will memorize and output the programmed recording start and end times for plural programs to be registered successively. Thus, if the start and end times are outputted, the programmed recording time detector will calculate the programmed recording time by subtracting the programmed recording start time from the programmed recording end time, and will add all such calculation results to obtain the total programmed recording time for all the programs registered.

Meanwhile, the recording capacity detector will detect the recording capacity of the video tape which the user has loaded into the deck in order to carry out a programmed recording. Then the recording capacity time base data generator will generate the time base data corresponding to the detected recording capacity and the doubled time base data together. Further, the running mode signal generator will compare the recording capacity time base data provided by the recording capacity time base data generator and the total programmed recording time provided by the programmed recording time detector, and thereby generate the predetermined video tape running mode signal such as an SP mode signal, an LP mode signal, or an SLP mode signal to be applied to a microcomputer.

BRIEF DESCRIPTION OF THE DRAWINGS

The above object and other advantages of the present invention will become more apparent by describing the preferred embodiment of the present invention in more detail with reference to the attached drawings in which.

DESCRIPTION OF THE PREFERRED EMBODIMENT

Figure 1:
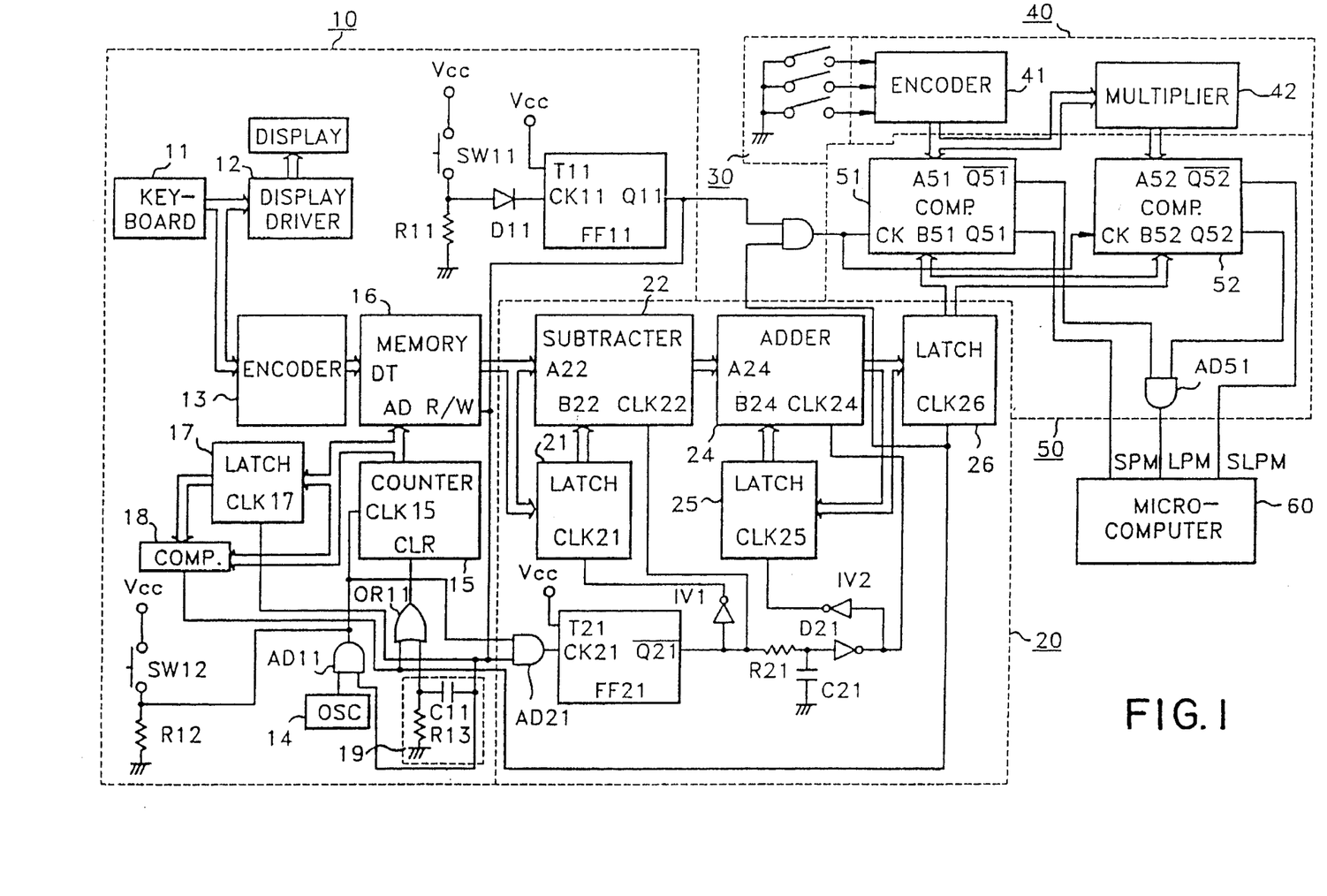
FIG. 1 illustrates the automatic running mode setting circuit according to the present invention.

FIG. 1 illustrates the automatic running mode setting circuit according to the present invention. As shown in this drawing, the circuit according to the present invention comprises a programmed recording time memory device 10 for memorizing and outputting the programmed recording start and end times successively for a plurality of broadcast programs chosen by the user; a programmed recording time detector 20 for detecting the whole programmed recording time for plural broadcast programs by subtracting the start time from the end time outputted from the programmed recording time memory means 10 for each of the programs to calculate each programmed recording time, and by adding all such recording times to obtain the total programmed recording time for all the programs; a recording capacity detector 30 for detecting the recording capacity of the video tape loaded in the deck; a recording capacity time base data generator 40 for outputting the recording capacity time base data corresponding to the recording capacity detected by the recording capacity detector 30; and a running mode signal generator 50 for outputting a video tape running mode signal toward a microcomputer 60 which controls the operation of the whole system by comparing both output signals of the programmed recording time detector 20 and the recording capacity time base data generator 40.

The programmed recording time memory device 10 uses a display driver 12 for driving the output signal of a keyboard 11 to be displayed at a display unit display; an encoder 13 for encoding the output signal of the keyboard 11 to generate the programmed recording start time signals and the programmed recording end time signals; a flip-flop FF11 for being toggled upon pressing of a time switch SW11; an AND gate AD11 for logically multiplying output signals of the flip-flop FF11 and an oscillator 14; a counter 15 for counting the output signals of the AND gate AD11 or the number of pressings of a program check switch SW12; a memory 16 for performing read/write operations in correspondence with the output signals of the flip-flop FF11, and for storing and outputting the output signals of the encoder 13 to and from the addresses designated by the signals of the counter 15; a latch 17 for storing output signals of the counter 15 in response to the output signals of the flip-flop FF11; a comparator 18 for comparing the output signals of the counter 15 and the latch 17 for confirming their equivalence; a differentiator 19 composed of a condenser C11 and a resistance R13, and for differentiating the output signals of the flip-flop FF11; and an OR gate OR11 for logically adding the output signals of the comparator 18 and the differentiator 19, and for clearing the counter 15.

The programmed recording time detector 20 uses an AND gate AD21 for logically multiplying output signals of the flip-flop FF11 and the AND gate AD11, or for logically multiplying the output signals of the flip-flop FF11 and the number of pressings of the program check switch SW12 of the programmed recording time memory device 10; a flip-flop FF21 for being toggled in response to the output signal of the AND gate AD21; a latch 21 for storing and outputting the output signals of the memory 16 of the programmed recording time memory device 10 in response to the output signals of the flip-flop FF21; a subtractor 22 for subtracting the output signals of the latch 21 from the output signals of the memory 16; a delayer 23 composed of a resistance R21, a condenser C21 and a diode D21, and for delaying the output signals of the flip-flop FF21 for a predetermined period of time; an adder 24 for adding the output signals of the subtracter 22 and the output signals of the later-mentioned latch 25 in response to the output signals of the delayer 23; a latch 25 for latching the output signals of the adder 24 in response to the output signals of the delayer 23, and for inputting the signals again to the adder 24; and a latch 26 for storing and outputting the output signals of the adder 24 in response to the output signals of the comparator 18 of the programmed recording time memory device 10.

Figure 2A:
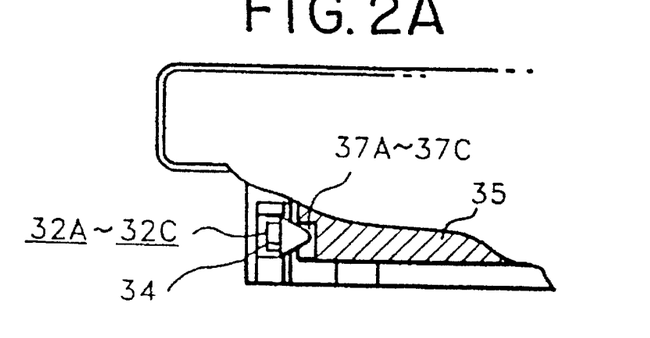
FIGS. 2(A) and 2(B) are respectively a partly cut-out side view and a rear view showing a deck portion having a video tape recording capacity detecting switch for use in the automatic running mode setting circuit according to the present invention.
Figure 2B:
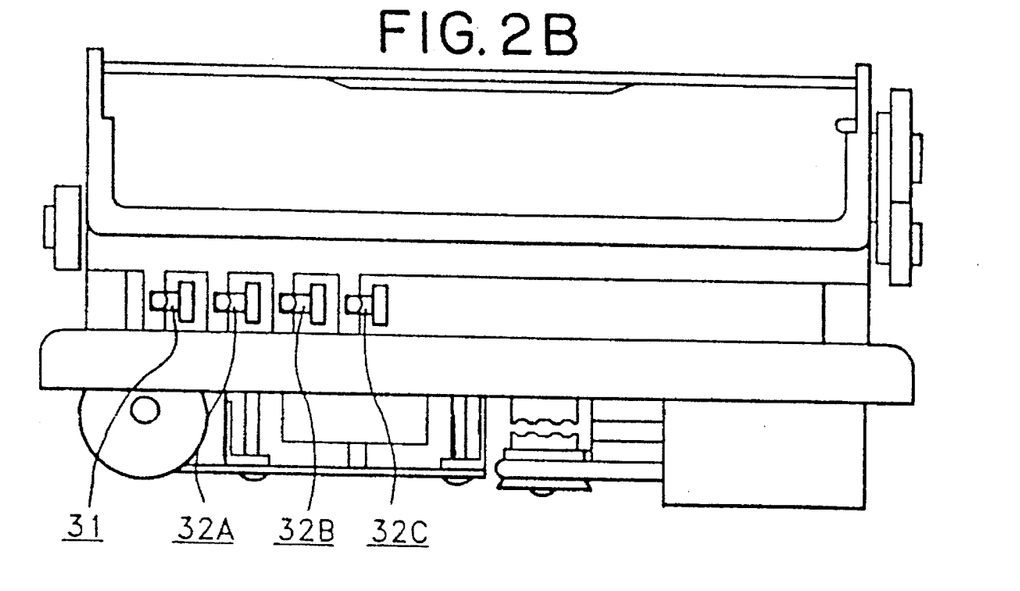
Figure 3:
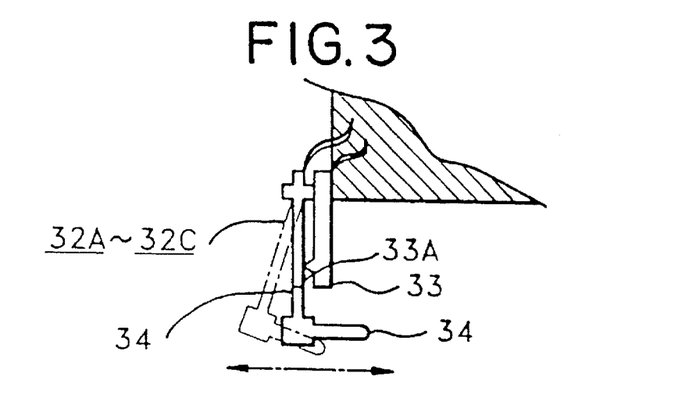
FIG. 3 is an enlarged schematic diagram illustrating the operation of a recording capacity detecting switch adopted in the automatic running mode setting circuit according to the present invention.

As shown in FIGS. 2 and 3, the recording capacity detector 30 is provided with a plurality of recording capacity detecting switches 32A–32C which respectively use a fixed piece 33 having a fixed contact 33A and a movable piece 34 having an actuation rod 34A, the recording capacity detecting switches 32A–32C being installed in parallel at certain intervals. Beside the switch 32A, there is installed an erroneous erasing prevention switch 31.

Figure 4A:
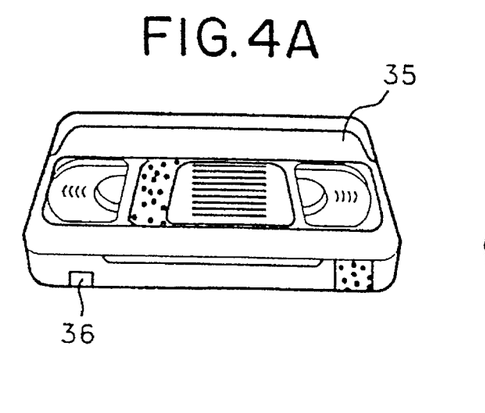
FIGS. 4A to 4F are perspective views of several video tapes provided with detecting grooves for different recording capacities, which are operatively engaged with the recording capacity detecting switch shown in FIG. 3.

As shown in FIGS. 4(A)–4(F), an erroneous erasing prevention groove 36 is provided on the video tape 35, while a certain number of recording capacity detecting grooves 37A–37C are provided beside the erroneous erasing prevention groove 36 in correspondence with switches 32A–32C, the number of the grooves 37A–37C depending on the recording capacity of the video tape 35. That is, in the case of a 30 minute tape, grooves 37A–37C are not protected, while in the cases of 60, 90, 120, 180 and 240 minute tapes, the groove 37A, the groove 37B, the grooves 37A and 37B, the groove 37C and the grooves 37A and 37C are provided respectively, so that, when the video tape is loaded into the deck, the switches 32A–32C should be selectively opened or closed, as shown in FIG. 5.

The recording capacity time base data generator 40 uses of an encoder 41 for encoding the output signals of the recording capacity detector 30 to output the recording capacity time base data, and a multiplier 42 for multiplying two (2) by the time base data from the encoder 41.

The running mode signal generator 50 uses of a comparator 51 for performing a comparison as to whether the output signals of the encoder 41 of the recording capacity time base data generator 40 are larger than the output signals of the latch 26 in the programmed recording time detector 20, and for providing a standard play mode signal SPM through a non-inverting output terminal Q51; a comparator 52 for performing a comparison as to whether the output signals of the multiplier 42 of the recording capacity time base data generator 40 are larger than or equal to the output signals of the latch 26, and for providing a super long play mode signal SLPM through an inverting output terminal $\overline{Q52}$; and an AND gate AD51 for logically multiplying the output signals of the inverting output terminal $\overline{Q51}$ of the comparator 51 and the non-inverting output terminal Q52 of the comparator 52 in order to output a long play mode signal LPM.

In the circuit according to the present invention constituted as described above, on the condition that the power voltage Vcc is applied to the circuit, when plural broadcast programmed recordings are to be registered in the video tape recorder, the output terminal Q11 of the flip-flop FF11 will output a low level signal, and therefore, the outputted low level signal will be applied to a read/write terminal $R/\overline{W}$ of the memory 16, so that the memory 16 should be able to perform writing operations.

Under this condition, if the user presses the program check switch SW12, the power voltage Vcc will be applied through the switch SW12 to a clock terminal CLK15 of the counter 15, and therefore, the counter 15 will perform a count to supply the counted result to an address port AD of the memory 16, thereby designating the address of the memory where the programmed recording start time for the first program is to be stored.

Under this condition, if the user feeds the programmed recording start time for the first program by means of a keyboard 11, the start time will be applied the display driver 12 to be displayed on the display unit display. At the same time, the start time will be encoded by the encoder 13, so that the encoded data should be fed into a data input port DT of the memory 16, and that the memory 16 should store the programmed recording start time of the first program at the address designated by the output signal of the counter 15.

Successively, if the user again presses switch SW12, the counter 15 will perform count operations to designate the address of the memory where the programmed recording end time for the first program is to be stored. Then, if the programmed recording end time for the first program is fed through the keyboard 11, the end time will be displayed on the display unit display through the display driver 12, and at the same time, will be stored through the encoder 13 to the memory 16.

Thus, if the switch SW12 is repeatedly pushed, the counter 15 will perform count operations for the number of pushings of the switch SW12, and at the same time, the addresses will be successively designated where the start and end times of the first program, the start and end times of the second program, and so on, are to be respectively stored, while the start and end times of the first program, the start and end times of the second program, and so on, can be stored at the respective addresses through manipulations of the key on keyboard 11.

Thus, upon completion of the time setting of the broadcast program for a programmed recording, if the switch SW11 is pushed, the flip-flop FF11 will be toggled to output a high level signal through its output terminal Q11. The high level output signal will be supplied to the read/write terminal R/W, to the clock terminal CLK17 of the latch 17, to one of the input terminals of the AND gate AD11, and to the differentiator 19. Therefore, the memory will be enabled to perform reading operations, and the latch 17 will store and output the output signals of the counter 15. That is, the latch 17 will store and output the last address of the programs, which is stored in the memory, while the differentiator 19 will output a high level differentiation signal to pass it through the OR gate OR11 to a clear terminal CLR of the counter 15. Accordingly, the counter 15 will be cleared, and the AND gate AD11 will output an oscillating signal after receipt of the signal from the oscillator 14 through its input terminal.

If a first oscillating signal is generated from the oscillator 14, that signal is supplied through the AND gate AD11 to the clock terminal of the the counter 15, so that the counter 15 should be able to count the oscillating signals, and thereby designate the address of the memory 16 storing the start time of the programmed recording for the first program. Therefore, the memory 16 will output the programmed recording start time for the first program. Upon generation of a second oscillating signal by the oscillator 14, the counter 15 will designate the next address in the memory 16, so that the memory 16 should be able to output the programmed recording end time for the first program.

Thus, if the oscillating signals are generated from the oscillator 14, the counter 15 will count the oscillating signals, and at the same time, will designate the addresses in the memory 16 successively, so that the memory 16 should be able to successively output from its stored start and end times of the first program, the start and end times of the second program; and so on.

Through the above procedure, if the last address for the programmed recording start and end times in the memory 16 are designated by the counter 15, the memory 16 will output the last programmed recording start and end times, and then, the output signals of the counter 15 and the latch 17 will become the same. Therefore, the comparator 18 will output a high level signal through the output terminal Q18, and that high level signal will be applied through the OR gate OR11 to the clear terminal CLR of the counter, so that the counter should be cleared.

As a result, the programmed recording time memory device 10, upon pushing of the switch SW12 by the user, will store into the designated memory addresses the programmed recording start and end times of the first program, the programmed recording start and end times of the second program, and so on, as set through the keyboard. If the time programming of broadcast programs is completed, the memory 16 will output successively the programmed recording start and end times of the first program, the programmed recording start and end times of the second program, and so on in response to the oscillating signals of the oscillator 14.

The programmed recording time detector 20 is operated as described below. If a first oscillating signal is output by the oscillator 14, that oscillating signal will be supplied through the AND gates AD11 and AD21 to the clock terminal CK21 of the flip-flop FF21, and therefore, the flip-flop FF21 will be toggled to output a low level signal through its output terminal $\overline{Q21}$. As the output signal $\overline{Q21}$ of low level is converted into the high level signal by an inverter IV1 and is applied to a clock terminal CLK21 of a latch 21. Then, the programmed recording start time for the first program from the memory 16 in response to the first oscillating signal of the oscillator 14 will be input into the latch 21.

Under this condition, if a second oscillating signal is received from the oscillator 14, then the flip-flop FF21 will be toggled to output a high level signal through the output terminal $\overline{Q21}$, and that high level signal will be received as the clock signal at the clock terminal CLK22 of the subtractor 22. Therefore, according to the second oscillation signal from the latch 21, the memory 16 will output the programmed recording end time for the first program to supply it to the input port A22 of the subtractor 22, so that the subtractor 22 should be able to output the programmed recording time for the first program by subtracting the programmed recording start time from the programmed end time. Thus, in response to the oscillating signals from the oscillator 14, the programmed recording start times for the first program, the second program and so on, as received from memory 16, are subtracted from the programmed recording end times for the first program, the second program and so on, as received from memory 16, in order to ultimately successively output the programmed recording times for the first program, the second program and so on.

The programmed recording times for the first program, the second program and so on as received from the subtractor 22, are applied to the input port A24 of the adder 24 in response to the first oscillating signal. While the high level signal outputted from the output terminal $\overline{Q21}$ of the flip-flop FF21, which occurs in response to the second oscillating signal, will be delayed for a predetermined period of time by the delayer 23, and then, supplied to the clock terminal CLK25 of the latch 25. According to the third oscillating signal, the output terminal $\overline{Q21}$ of the flip-flop FF21 is to generate the low level signal, which makes the latch 25 inoperative, and in turn, is converted to a high level signal by an inverter IV2. The high level signal from the inverter IV2 is applied to the clock terminal CLK24 of the adder 24 so that the adder 24 should be able to combine the programmed recording times from the input terminals A24 and B24 to generate the summed-up time. As for the repeated operations, the adder 24 can generate the sum of the respective programmed recording times of the first, the second broadcast program and so on.

Thus after the programmed recording end time for the last program is received from the memory 16 where it is stored, thereby completing the reading of the total programmed recording time for all the programs, the comparator 18 will generate an output signal of high level. The high level output signal will be applied to the clock terminal CLK26 of the latch 26, and therefore, the latch 26 will store and output the total programmed recording time, with the result that the total programmed recording time data will be applied to input terminals B51, B52 of the comparator 51, 52 of the running mode signal generator 50.

That is, the programmed recording time detector 20 will subtract the programmed recording start times from the programmed recording end times for all the programs by means of the subtracter 22, thereby detecting the programmed recording times for the respective programs. The detector 20 also adds the respective programmed recording times by means of the adder 24 to obtain the total programmed recording time for all the programs, and then, it outputs a signal for the whole programmed recording time to input it into the comparator 51,52.

Meanwhile, if the video tape 35 for a programmed recording is loaded into the deck, the recording capacity detecting switches 32A–32C are selectively open or closed. That is, as shown in FIG. 4A, if a video tape 35 of 30 minutes recording capacity having no recording capacity detecting grooves 37A–37C is loaded in the deck, the back side of the video tape 35 will push the actuation rod 34A, and therefore, the movable piece 34 will be separated from the fixed contact 33A of the fixed piece 33, thereby opening all the switches 32A–32C.

Figure 4B:
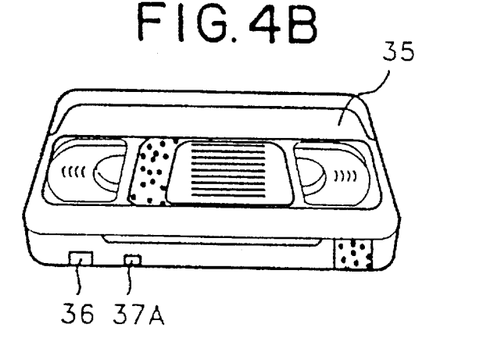
Figure 4C:
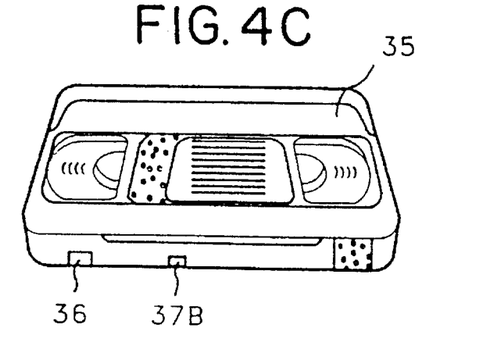
Figure 4D:
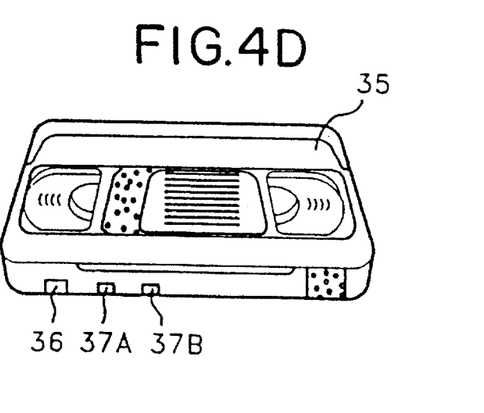
Figure 4E:
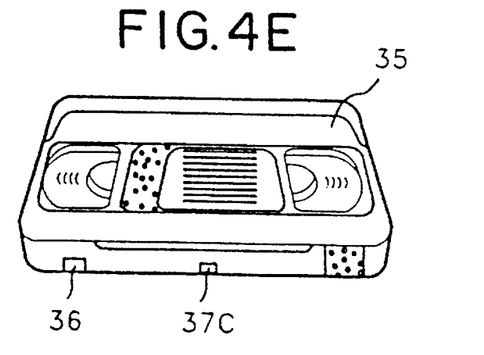
Figure 4F:
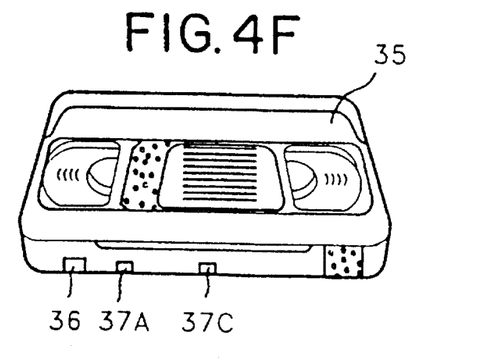
Figure 5:
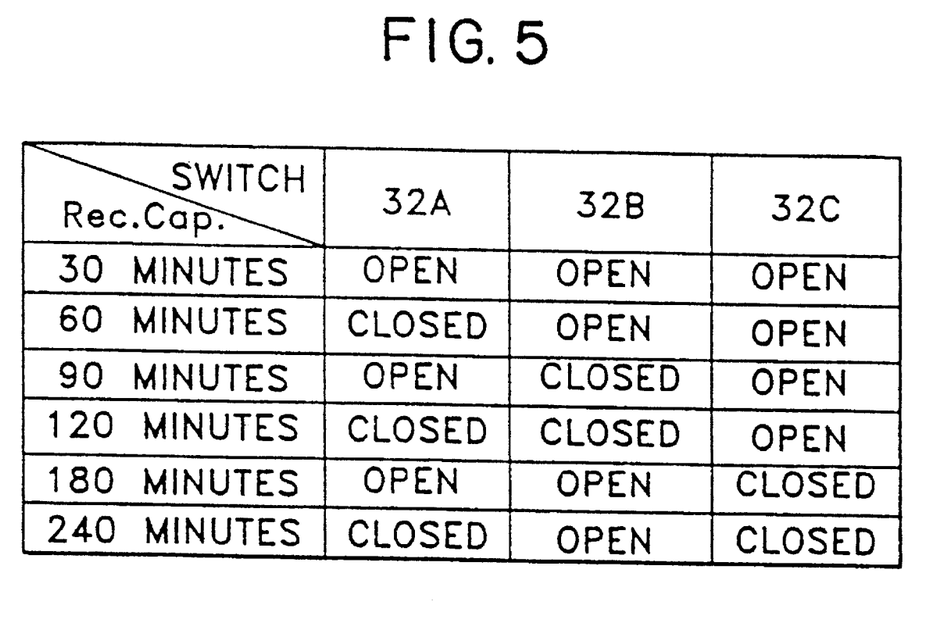
FIG. 5 is a table showing the operating states of the detecting switch for different recording capacities of several video tapes loaded in the deck, according to the present invention.

If a video tape 35 of 60 minutes capacity having the detecting groove 37A as shown in FIG. 4B is loaded, the actuation rod 34A of the switch 32A will be inserted into the groove 37A, and therefore, the movable piece 34 will be kept in contact with the fixed contact 33A of the fixed piece 33, thereby closing only switch 32A.

If video tapes having respectively 90 minutes, 120 minutes, 180 minutes, and 240 minutes as shown in FIG. 4C to 4F are loaded into the deck, the switches 32A–32C will be selectively closed or open in accordance with the recording capacities of the video tapes.

Further, in accordance with the selective closing or opening of the switches 32A–32C, these switching signals will be encoded by the encoder 41 to output the recording capacity. The recording capacity time base data will be applied to the input port A51 of the comparator 51, and at the same time, will be multiplied by twice by the multiplier 42 so as to be applied to the input port A52 of comparator 52. Therefore, comparators 51,52 will respectively compare the recording capacity time base data with the total programmed recording time, and the multiplied by-two recording capacity time base data with the total programmed recording time, and will selectively output high level signals through the output terminals $\overline{Q51}$, Q51, Q52, $\overline{Q52}$, with the result that a standard play mode signal SPM, a long play mode signal LPM, or a super long play mode signal SLPM will be provided to microcomputer 60.

For example, upon loading a video tape having a capacity of 120 minutes into the deck, the recording capacity time base data will be applied to the input port A51 of the comparator 51, and at the same time, will be multiplied to 240 minutes to be applied to the input port A52 of comparator 52. If the total programmed recording time is smaller than 120 minutes, a high signal will be transmitted through the output terminal Q51 of the comparator 51, with the result that a standard play mode signal SPM will be applied to the microcomputer 60. If the total programmed recording time is more than 120 minutes and less than 240 minutes, then the comparators 51, 52 will output high potentials through their output terminals $\overline{Q51}$, Q52, so that a long play mode signal LPM should be input through the AND gate AD51 to the microcomputer 60. If the total programmed recording time is over 240 minutes, the comparator 52 will output a high potential through its output terminal $\overline{Q52}$, so that a super long play mode signal SLPM should be input to the microcomputer 60.

The running mode signal generator 50 will compare the total programmed recording time for all of the programs with the recording capacity time base data of the video tape 35 loaded in the deck. If the total programmed recording time is shorter than the recording capacity time base data, then the running mode signal generator 50 will output a standard play mode signal SPM. If the total programmed recording time is longer than the recording capacity time base data, and is shorter than twice the recording capacity time base data, it will output a long play mode signal LPM. While, if the total programmed recording time is longer than twice the recording capacity time base data, it will output a super long play mode signal. In accordance with the mode signal SPM, LPM, or SLPM generated as described above, the microcomputer 60 will drive the video tape in standard play, long play, or super long play mode upon arrival of the programmed time to carry out the programmed recordings.

As described above in detail, the circuit according to the present invention, in performing a programmed recording, compares the total program recording time for all the programs with the recording capacity of the video tape in order to set the running mode automatically, and therefore, not only the troublesome task of manually shifting the running mode switches by the user is eliminated, but also the failure of recording of the trailing portion of the program due to insufficient capacity of the video tape can be prevented. Alternatively, the process may be practiced by making the comparison while recording said program on the video tape.

I claim:

1. An automatic video tape running mode setting circuit for programmed recordings, comprising:
    programmed recording time memory means for memorizing and outputting programmed recording start and end times successively for a plurality of programs set by an operator,
    a programmed recording time detector for providing output signals by subtracting the start time from the end time outputted from said programmed recording time memory means for each of the programs to calculate each programmed recording time;

a recording capacity detector for detecting recording capacity of the video tape, said video tape being housed in a cassette loaded in a deck;

a recording capacity time base data generator for generating time base data corresponding to the recording capacity detected by said recording capacity detector;

a running mode signal generator for comparing the output signals of the programmed recording time detector and the recording capacity time base data generator, and for generating and transmitting a video tape running mode signal; and control means for controlling video recording speed to be maintained for each of said plurality of programs in a single recording mode, said recording speed corresponding to said video tape running mode signal.

2. The automatic video tape running mode setting circuit for programmed recordings according to claim 1, further comprised of said programmed recording time memory means comprising:

a display driver driving an output signal of a keyboard to be displayed at a display unit;

a first encoder encoding the output signal of the keyboard to generate time signals representative of said programmed recording start and end times;

a first flip-flop connected to be to toggled in response to activation of a time switch;

a first AND gate logically multiplying output signals of said first flip-flop and an oscillator;

a counter counting output signals of said first AND gate and the number of pressings of a program check switch;

a memory performing read/write operations in correspondence with the output signals of said first flip-flop, and storing and outputting the time signals of said first encoder to and from addresses designated by output signals of said counter;

a first latch storing output signals of said counter in response to the output signals of said first flip-flop;

a first comparator comparing the output signals of said counter and output signals of said first latch for confirming equivalence;

a differentiator differentiating the output signals of said first flip-flop; and an OR gate logically adding output signals of said first comparator and said differentiator, and clearing said counter.

3. The automatic video tape running mode setting circuit for programmed recordings according to claim 2, wherein said programmed recording time detector comprises:

a second AND gate logically multiplying output signals of said first flip-flop and one of said first AND gate and the number of pressings of said program check switch of said programmed recording time memory means;

a second flip flop toggled in response to the output signals of said second AND gate;

a second latch storing and outputting the output signals of said memory of said programmed recording time memory means in response to the output signals of said second flip-flop;

a subtractor subtracting the output signals of said second latch from the output signals of said memory;

a delayer connected to delay the output signals of said second flip-flop for a predetermined period of time;

an adder adding output signals of said subtractor and output signals of a third latch in response to output signals of said delayer;

said third latch latching output signals of said adder in response to the output signals of said delayer, and inputting the latched signals again to said adder; and a fourth latch storing and outputting the output signals of said adder in response to the output signals of said first comparator of said programmed recording time memory means.

4. The automatic video tape running mode setting circuit for programmed recordings according to claim 3, wherein said recording capacity time base data generator comprises:

a second encoder encoding the output signals of said recording capacity detector and outputting the recording capacity time base data; and a multiplier multiplying by two the output signals of said second encoder.

5. The automatic video tape running mode setting circuit for programmed recordings according to claim 4, wherein said running mode signal generator comprises:

a second comparator performing a comparison as to whether the output signals of said second encoder of said recording capacity time base data generator are larger than the output signals of said fourth latch of said programmed recording time detector, and outputting a standard play mode signal SPM through a non-inverting output terminal of said second comparator;

a third comparator performing a comparison as to whether the output signals of said multiplier of said recording capacity time base data generator are larger than or equal to the output signals of said fourth latch, and for outputting a super long play mode signal SLPM through an inverting output terminal of said third comparator; and a third AND gate logically multiplying the output signals of a non-inverting output terminal of said third comparator and an inverting output terminal of said second comparator in order to output a long play mode signal LPM.

6. The automatic video tape running mode setting circuit for programmed recordings according to claim 1, wherein said recording capacity detector includes a plurality of recording capacity detecting switches installed at certain intervals beside an erroneous erasing prevention switch, and also includes first, second and third recording capacity detecting grooves at a position on said cassette housing the tape corresponding to said recording capacity detecting switches, said first, second and third recording capacity detecting grooves being selectively provided in such a manner that, when the recording capacity of the video tape is 30 minutes, no grooves are provided, and when the recording capacities are 60 minutes, 90 minutes, 120 minutes, and 180 minutes, then the first groove, the second groove, the first and second grooves, and the third groove are respectively provided, so that corresponding ones of said plurality of recording capacity detecting switches are selectively closed.

7. An automatic video tape running mode setting method for programmed recordings, comprising the steps of:

memorizing programmed recording start and end times for a program set by a user;

detecting programmed recording time for the program and providing said programmed recording time as a first output signal;

detecting recording capacity of the video tape being housed in a cassette loaded in a deck;

generating as a second output signal, time base data corresponding to the detected recording capacity;

generating a video tape running mode signal by making a single comparison between the first and second output signals; and controlling a video tape recording speed in response to said video tape running mode signal.

8. The process of claim 7, further comprised of making said comparison before starting to record said program on the video tape.

9. The process of claim 8, further comprised of maintaining said video recording speed in a single recording mode after starting to record said program on the video tape.

10. The process of claim 7, further comprised of making said comparison while recording said program on the video tape.

11. An automatic video tape running mode setting method for programmed recordings, comprising the steps of:

memorizing and outputting programmed recording start and end times successively for a program set by a user;

detecting programmed recording time for the program and providing said programmed recording time as a first output signal;

detecting recording capacity of the video tape housed in a cassette loaded in a deck;

generating as a second output signal time base data corresponding to the detected recording capacity;

making a decision of whether to change a speed for recording of the program onto the tape, before starting recording of the program, by making a single comparison between the first and second output signals; and during said recording of the program, controlling said speed of recording in dependence upon said decision.

12. An automatic video tape running mode setting circuit, comprising:

first means for memorizing and outputting programmed recording start and end times successively for a program set by a user;

second means for detecting programmed recording time for the program by subtracting start time from end time for the program to calculate programmed recording time;

third means for detecting recording capacity of the video tape housed in a cassette loaded in a deck; and fourth means for generating a video tape running mode signal in dependence upon a single comparison between the recording time and the recording capacity.

13. A process for automatically setting video tape running mode for programmed recording, comprising:

memorizing programmed recording start and end times for a program set by a user;

determining programmed recording time for the program by subtracting start time from end time of the program;

providing said programmed recording time as a first output signal;

detecting recording capacity of the video tape being housed in a cassette loaded into a deck;

generating as a second output signal, time base data corresponding to the detected recording capacity;

generating a video tape running mode signal by making a single comparison between the first and second output signals; and controlling a video tape recording speed in response to said video tape running mode signal.

14. The process of claim 13, further comprised of making said comparison before starting to record said program on the video tape.

15. The process of claim 14, further comprised of maintaining said video recording speed in a single recording mode after starting to record said program on the video tape.

16. The process of claim 13, further comprised of making said comparison while recording said program on the video tape.

17. An automatic video tape recording mode setting circuit for controlling the recording mode a programmed recording, comprising:

means for storing a start time and an end time for a program to be recorded;

means for generating a first signal representative of a length of recording time required for said program based on said stored start time and end time;

means for generating a second signal representative of a recording capacity of a video tape;

means for a comparing said first signal to said second signal, and for generating one of a plurality of recording mode signals based on said comparison; and control means for controlling the recording of said program on said videotape at a single speed represented by said one of a plurality of recording mode signals generated by said comparing means.

* * * * *